Patented May 6, 1930

1,757,158

UNITED STATES PATENT OFFICE

JAMES BADDILEY, OF BLACKLEY, MANCHESTER, ENGLAND, ASSIGNOR TO BRITISH DYESTUFFS CORPORATION LIMITED, OF MANCHESTER, ENGLAND

DYEING OF REGENERATED CELLULOSE MATERIAL

No Drawing. Original application filed May 21, 1927, Serial No. 193,387, and in Great Britain December 10, 1926. Divided and this application filed March 8, 1928, Serial No. 260,249. Renewed July 6, 1929.

The invention relates to processes for the production of regenerated cellulose products dyed in even level shades with the new secondary disazo dyes described in my co-pending specification Serial No. 193,387, of which the present application is a division. These dyestuffs are not well suited for the commercial dyeing of cotton for while they do possess a certain affinity for cotton the affinity is in an inferior degree, making the dyes, in view of the present state of the art, of little or no industrial interest as cotton dyes. On the other hand I have discovered that in spite of this slight affinity for cotton there is inherent in these dyes a valuable affinity for regenerated cellulose. Regenerated cellulose materials are dyed in even level shades by these dyes.

These new secondary disazo dyes are obtained by combining the diazo compound of a paranitroarylamine, including a derivative thereof in this term, containing at least one solubilizing acidic substituent, such as a sulphonic or carboxylic group, with any usual middle component, rediazotizing and combining with an amino naphthol sulphonic acid, including N-substitution products of the same in this term.

A small number of dyestuffs of this class have already been described, for example, in British Patents Nos. 4767/09, 4768/09, 11364/09, but in all these previously known examples the end components used have been 2-amino-5-naphthol-7-sulphonic acid or its N-alkyl, aryl or acyl derivatives, or with substitution products of these compounds substituted in the ortho position to the amino group. It is well known that in the application of ordinary blue cotton dyes to regenerated cellulose in the form of artificial silk there is great difficulty, amounting at times to impossibility, in obtaining level shades. I therefore specifically except from my invention all dyestuffs of the above general class which contain 2-amino-5-naphthol-7-sulphonic acid or 2-amino-5-naphthol-1:7-disulphonic acid or their N-alkyl, aryl or acyl derivatives as end components as defined in the said specifications, and other substitution products of 2-amino-5-naphthol-7-sulphonic acid substituted in the ortho position to the amino group. In dyeing regenerated cellulose materials with the usual substantive cotton blue dyestuffs, the dyeings obtained frequently come out very unevenly dyed, owing to the variable avidity of the fiber for these dyestuffs. The affinity for regenerated cellulose of my new dyestuffs obtained according to the disclosure in my application Ser. No. 193,387 and which, as stated, yield blue shades, is of a nature differing from that of ordinary cotton dyes and is such that dyeings of a very superior degree of levelness and evenness may be produced on such regenerated cellulose materials. The present invention is an important advance in the production of dyed regenerated cellulose materials having even level shades. The present invention is limited to dyeing regenerated cellulose materials in even level shades with dyes obtained by coupling an amino naphthol sulphonic acid in which the shortest chain between the nitrogen atom and the oxygen of the hydroxyl group comprises less than five atoms. These dyes may be represented by the general formula

$$O_2N-R_1-N=N-R_2-N=N-R_3$$

wherein $R_1$ represents a divalent aryl residue containing at least one solubilizing acidic group, $R_2$ represents a divalent aryl residue and $R_3$ represents a coupled amino naphthol sulphonic acid in which the shortest chain between the nitrogen atom and the oxygen of the hydroxyl group comprises less than 5 atoms and in which the nitro group is attached to $R_1$ in para position to the azo group.

In practising my invention, the dyestuff is dissolved in warm water, with or without the adjuncts usual for dye-baths, and the regenerated cellulose material is entered into the warm bath which is then raised nearly to the boil. The goods are then removed, rinsed and dried.

In order to further illustrate the invention, the following example is given:

*Example.*—The regenerated cellulose silk fabrics are dyed in the usual manner, the following conditions being typical, but I do not limit myself to the conditions here described.

The dye-bath is made up from 3,000 parts of water, 3 parts of soap, 15 parts of Glauber's salt and one part of the dyestuff having the formula

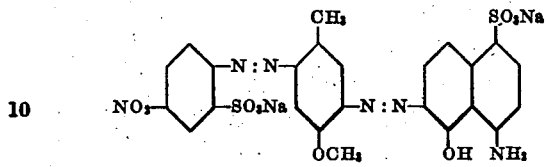

which may be obtained as described in copending application Serial No. 193,387. 100 parts of the regenerated cellulose silk are entered into the bath at about 40° C. and the bath is then raised nearly to boiling, the dyeing being then continued for about one hour. The goods are then removed, rinsed and dried. The fabric is dyed a level bright blue shade, fast to light and to alkalies.

What I claim and desire to secure by Letters Patent is:—

1. The process of dyeing regenerated cellulose materials in even level shades which comprises applying thereto disazo dyes obtained by coupling the diazo compound of a p-nitro arylamine containing at least one solubilizing acidic group with a primary arylamine which is capable of being diazotized after being coupled, rediazotizing and coupling with an amino naphthol sulphonic acid in which the shortest chain between the nitrogen atom and the oxygen of the hydroxyl group comprises less than five carbon atoms.

2. The process of dyeing regenerated cellulose materials in even level shades which comprises applying thereto the dyestuff having the formula

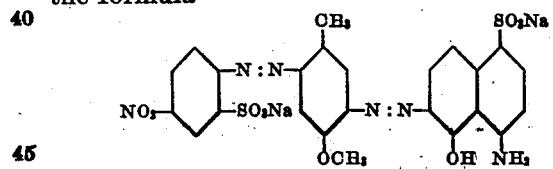

3. The process of dyeing regenerated cellulose materials in even level shades which comprises applying to said regenerated cellulose material the secondary disazo dyes having the general formula

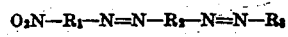

wherein $R_1$ represents a divalent aryl residue containing at least one solubilizing acidic group, $R_2$ represents a divalent aryl residue and $R_3$ represents a coupled amino naphthol sulphonic acid in which the shortest chain between the nitrogen atom and the oxygen of the hydroxyl group comprises less than 5 carbon atoms and in which the nitro group is attached to $R_1$ in para position to the azo group.

4. The process of dyeing regenerated cellulose materials in even level shades which comprises applying to said regenerated cellulose material the secondary disazo dyes having the general formula

wherein $R_1$ represents a divalent aryl residue containing at least one solubilizing acidic group, $R_2$ represents a divalent aryl residue and $R_4$ represents a coupled 1:8-amino naphthol sulphonic acid and in which the nitro group is attached to $R_1$ in para position to the azo group.

5. The process of dyeing regenerated cellulose materials in even level shades which comprises applying to said regenerated cellulose material the secondary disazo dyes having the general formula

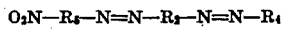

wherein $R_5$ represents a divalent aryl residue containing a sulphonic acid group, $R_2$ represents a divalent aryl residue and $R_4$ represents a coupled 1:8-amino naphthol sulphonic acid and in which the nitro group it attached to $R_5$ in para position to the azo group.

6. The process of dyeing regenerated cellulose materials in even level shades which comprises applying to said regenerated cellulose material the secondary disazo dyes having the general formula

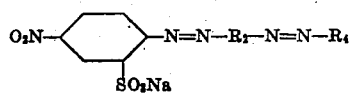

wherein $R_2$ represents a divalent aryl residue and $R_4$ represents a coupled 1:8-amino naphthol sulphonic acid.

7. Regenerated cellulose materials dyed with the secondary disazo dyes having the general formula

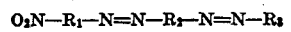

wherein $R_1$ represents a divalent aryl residue containing at least one solubilizing acidic group, $R_2$ represents a divalent aryl residue and $R_3$ represents a coupled amino naphthol sulphonic acid in which the shortest chain between the nitrogen atom and the oxygen of the hydroxyl group comprises less than 5 carbon atoms, and in which the nitro group is attached to $R_1$ in para position to the azo group, the said regenerated cellulose materials having an even level shade.

8. Regenerated cellulose materials dyed with the secondary disazo dyes having the general formula

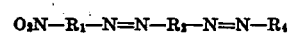

wherein $R_1$ represents a divalent aryl residue containing at least one solubilizing acidic group, $R_2$ represents a divalent aryl residue and $R_4$ represents a coupled 1:8-amino naphthol sulphonic acid and in which the nitro group is attached to $R_1$ in para position to the azo group, the said regenerated cellulose materials having an even level shade.

9. Regenerated cellulosic materials dyed with the secondary disazo dyes having the general formula

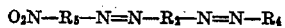

wherein $R_5$ represents a divalent aryl residue containing a sulphonic acid group, $R_2$ represents a divalent aryl residue and $R_4$ represents a coupled 1:8-amino naphthol sulphonic acid and in which the nitro group is attached to $R_5$ in para position to the azo group, the said regenerated cellulose materials having an even level shade.

10. Regenerated cellulose materials dyed with the secondary disazo dyes having the general formula

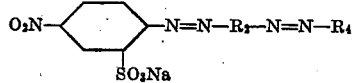

wherein $R_2$ represents a divalent aryl residue and $R_4$ represents a coupled 1:8-amino naphthol sulphonic acid, the said regenerated cellulose materials having an even level shade.

11. Regenerated cellulose materials dyed with the secondary disazo dyes having the general formula

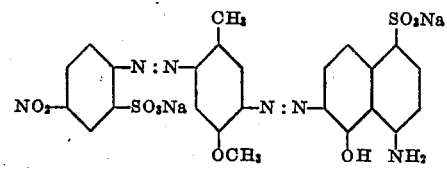

the said regenerated cellulose materials having an even level shade.

In testimony whereof I affix my signature.

JAMES BADDILEY.